March 6, 1956 C. D. ARCHER 2,737,005
DRAG HARROW
Filed Dec. 12, 1952 2 Sheets-Sheet 1

INVENTOR.
CLARENCE D. ARCHER,
BY
McMorrow, Berman & Davidson
ATTORNEYS

March 6, 1956  C. D. ARCHER  2,737,005
DRAG HARROW
Filed Dec. 12, 1952  2 Sheets-Sheet 2
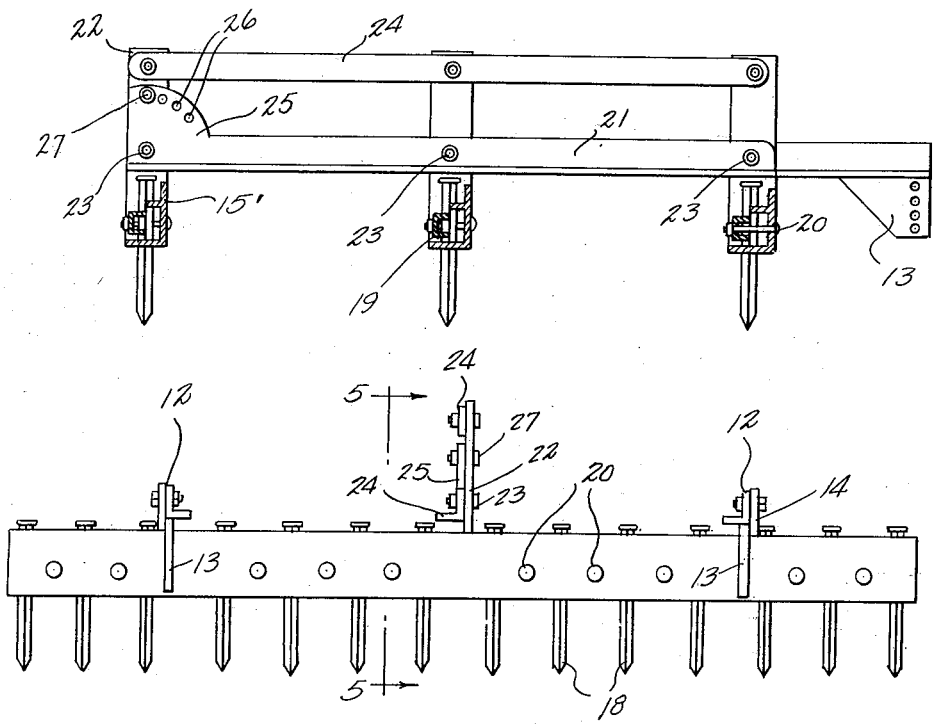
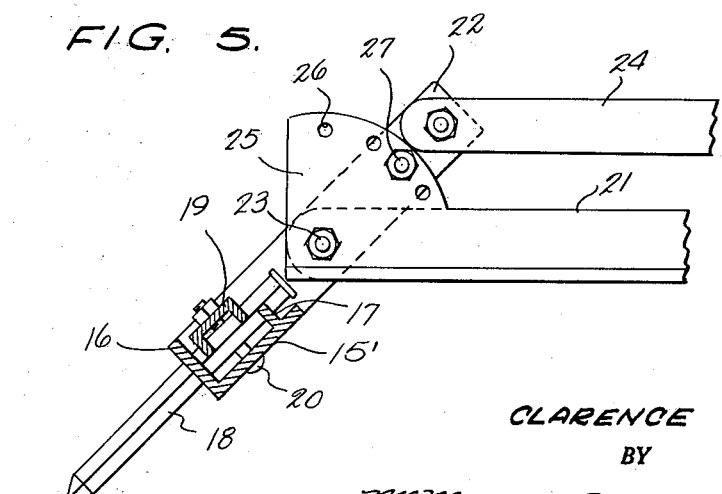
INVENTOR.
CLARENCE D. ARCHER,
BY
McMorrow, Berman & Davidson
ATTORNEYS

United States Patent Office 2,737,005
Patented Mar. 6, 1956

2,737,005
DRAG HARROW

Clarence Dee Archer, Knights Landing, Calif.

Application December 12, 1952, Serial No. 325,654

1 Claim. (Cl. 55—103)

This invention relates to agricultural implements, and more particularly to an improved drag harrow.

A main object of the invention is to provide a novel and improved drag harrow which is simple in construction, which is easy to adjust to provide a desired selected angular position of its teeth, and which has a wide range of utility for cultivating land of various different characteristics.

A further object of the invention is to provide an improved drag harrow which is inexpensive to construct, which is very durable, which may be easily adjusted to provide a selected angular position of its teeth, in accordance with the type of ground to be cultivated, and which may be readily adjusted to its desired position in a short period of time and with a minimum amount of labor.

Further objects and advantages of the invention will become apparent from the following description and claim, and from the accompanying drawings, wherein:

Figure 3 is a longitudinal vertical cross sectional view taken on the line 3—3 of Figure 1.

Figure 4 is a front end elevational view of the drag harrow of Figures 1 to 3.

Figure 5 is an enlarged vertical cross sectional detail view taken on the line 5—5 of Figure 4, showing a depending spike element in an adjusted inclined position and illustrating the manner in which the spike-supporting elements are locked in adjusted angular positions.

Figure 1:
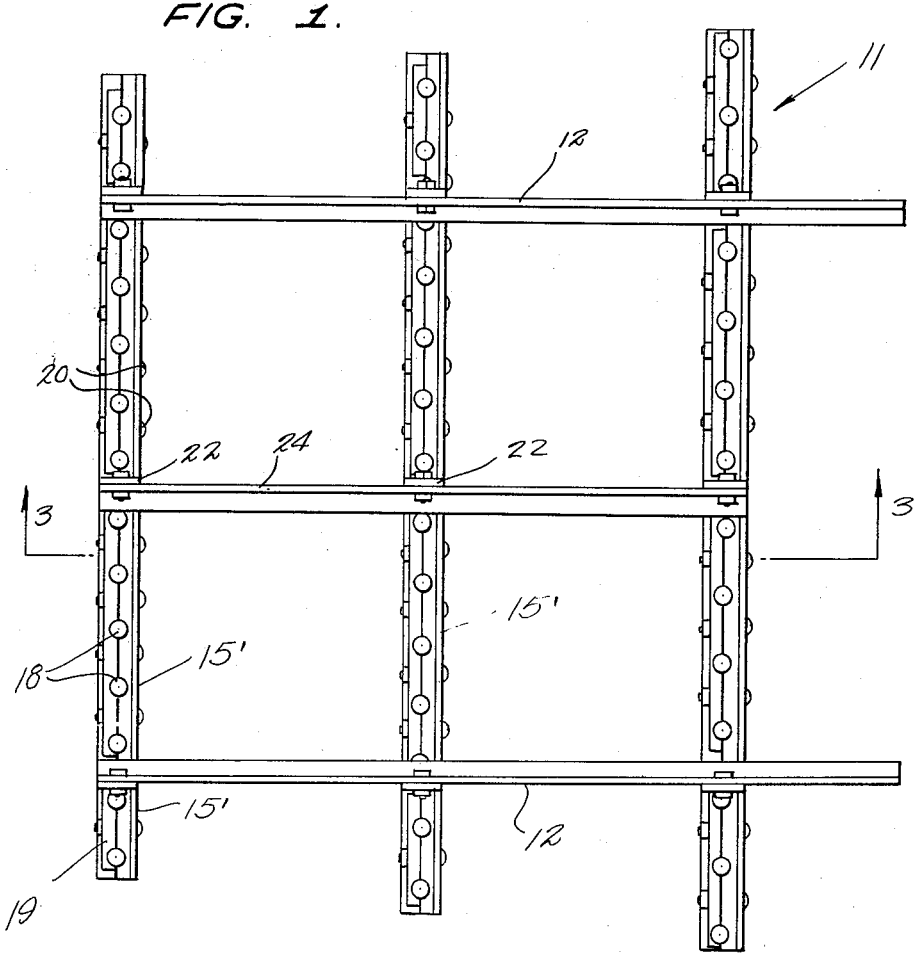
Figure 1 is a top plan view of an improved drag harrow constructed in accordance with the present invention.
Figure 2:
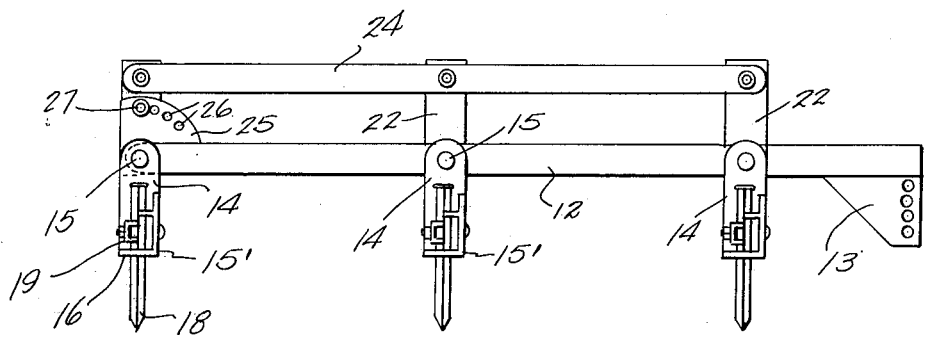
Figure 2 is a side elevational view of the drag harrow illustrated in Figure 1.

Referring to the drawings, the improved harrow is designated generally at 11 and comprises a pair of outer longitudinal bars 12, 12 of angled cross sectional shape, as shown in Figures 1 and 4, and said frame bars having secured to their forward ends the depending apertured draft plates 13, 13 for connecting the harrow to its tractive means, such as to a conventional farm tractor or the like.

Designated at 14 are spaced depending arms which are pivotally connected to the bars 12 at 15 at regularly spaced intervals therealong, the arms 14 being transversely aligned, as illustrated. Below the bars 12 are transversely extending bars rigidly secured to the lower ends of the arms 14, the transverse bars 15' being formed with the apertured bottom flanges 16 and with the notched upper flanges 17 parallel to the bottom flanges 16. The flanges 17 are formed with notches which are vertically aligned with the apertures in the flanges 16, and engaged in said notches and extending through said apertures are harrow spikes 18, said spikes being clamped in fixed, adjusted positions by transverse channel bars 19. The flanges of the channel bars are notched to receive the spikes 18, and the channel bars are secured to the transverse bars 15' by a plurality of bolts 20. As shown in Figure 1, the channel bars 19 are substantially coextensive in length with the transverse bars 15', and the notches in the flanges of the channel bars 19 have the same spacing as the notches in the flanges 17 and the apertures in the flanges 16. Therefore, the spikes 18 may be rigidly secured in adjusted positions, while the spikes may be angularly adjusted by swinging the depending arms 14 around their pivotal connections 15.

Designated at 21 is an intermediate longitudinal frame bar which is located midway between the outer longitudinal bars 12, 12. Designated at 22 are respective upstanding arms rigidly secured at their lower ends to the intermediate portions of the transverse bars 15' and pivotally connected at intermediate portions thereof to the intermediate bar 21, as shown at 23. Pivotally connected to the top ends of the upstanding arms 22 is the longitudinally extending link bar 24 which connects the arms 22 for simultaneous rotation, and similarly connects the respective spike-carrying transverse bars 15' for simultaneous angular adjustment.

The intermediate longitudinal frame bar 21 is formed at one end with a vertical, longitudinally extending plate element 25 provided with a plurality of apertures 26 spaced equidistantly from the pivotal connection 23 of the adjacent upstanding arm 22. Designated at 27 is a transverse bolt which may be engaged through a selected aperture 26 and which extends through an aperture in the adjacent upstanding arm 22 to secure the spike-carrying transverse bars 15 in a selected position of angular adjustment around the respective transversely aligned pivotal connections 15 and 23 of the arms 14 and 22. Therefore, the harrow teeth 18 may be adjusted to a selected angular position in accordance with the type of land to be cultivated, the spikes 18 being locked in adjusted position by engaging the bolt 27 through a selected aperture 26 of the upstanding plate member 25.

While a specific embodiment of an improved harrow having angularly adjustable teeth has been disclosed in the foregoing description, it will be understood that various modifications within the spirit of the invention may occur to those skilled in the art. Therefore it is intended that no limitations be placed on the invention except as defined by the scope of the appended claim.

What is claimed is:

In a harrow, laterally spaced outer longitudinal bars having forward and rearward ends, draft means on the forward ends of the outer bars, an intermediate longitudinal bar positioned between said outer bars and laterally spaced from the outer bars, said intermediate bar having a rearward end and a forward end, the forward end of the intermediate bar being devoid of draft means, transverse bars extending across the outer and intermediate bars and positioned therebelow, first arms pivoted on transverse axes to and depending from said outer bars and fixed to said transverse bars, second arms pivoted on transverse axes to said intermediate bar, said second arms having upper and lower portions, said lower portions depending below the intermediate bar and being fixed to said transverse bars, said upper portions extending above said intermediate bar, depending harrow teeth secured to said transverse bars, a longitudinal link bar extending along and spaced above said intermediate bar, said link bar having forward and rearward ends, means pivoting the upper portions of said second arms to said link bar on transverse axes, a sector plate fixed on said intermediate bar at the rearward end thereof, said sector plate being provided with an arc of spaced holes, and a bolt traversing the upper portion of a second arm and extending through a selected hole of said arc of holes.

References Cited in the file of this patent
UNITED STATES PATENTS

| 308,668 | Hense | Dec. 2, 1884 |
| 632,196 | Ohaven et al. | Aug. 29, 1899 |
| 638,769 | Smith | Dec. 12, 1899 |
| 872,957 | Mohr et al. | Dec. 3, 1907 |
| 1,222,918 | Bartel | Apr. 17, 1917 |

FOREIGN PATENTS

| 87,349 | Germany | May 29, 1896 |
| 615,600 | France | Oct. 16, 1926 |